July 2, 1946.   F. M. ASPIN   2,403,165
BEARING SURFACES FOR TAPERED ROTARY VALVES OF ENGINES AND PUMPS
Filed June 16, 1943

INVENTOR
F. M. Aspin
BY Walter Gumu
ATTORNEY.

Patented July 2, 1946

2,403,165

UNITED STATES PATENT OFFICE 2,403,165

BEARING SURFACE FOR TAPERED ROTARY VALVES OF ENGINES AND PUMPS

Frank Metcalf Aspin, Bury, England

Application June 16, 1943, Serial No. 491,010
In Great Britain March 16, 1942

3 Claims. (Cl. 251—103)

This invention relates to bearing surfaces for tapered rotary valves such as are used for internal combustion engines, pumps and like machines, wherein the valves are heavily loaded and have continuous rotation or oscillation as distinct from mere plug cocks.

One of the problems in connection with the use of tapered rotary valves for internal combustion engines, pumps and like machines is the selection and use of suitable bearing metals for the rotary valve plug and its housing. On the one hand there are obvious advantages in the use of relatively light magnesium and aluminium alloys for the cylinder block or head, but such metals are unsuitable to provide the bearing surface of a rotary valve both as regards their surface and their strength. Such light metals also have a relatively high co-efficient of expansion, compared with the known metals which are classed as bearing metals, such as certain steels, cast irons and bronzes, and consequently any bearing lining is difficult to secure where there are changes of temperature which could expand the housing away from its liner. Again, in connection with internal combustion engines or pumps it is very important that any bearing liner should have good contact with its housing for the dispersion of heat by conduction. Finally, the angle of taper presents a problem as regards securing a lining.

The object of the invention is an improved method of fitting and construction of lining for the bearing surfaces of such rotary valves.

The invention comprises the method of fitting and securing a housing liner for a tapered rotary valve wherein the liner and housing are formed with complementary stepped peripheral surfaces providing a plurality of substantially cylindrical surfaces of which those on the liner are an interference fit in those of the housing, when both are at substantially equal temperatures, and wherein the liner is inserted in the housing preferably by the temporary removal of such interference by employing a temporary change of temperature or temperature difference.

According to the invention a housing liner for a conical rotary valve is characterised in that it has a conical exterior formed of a plurality of substantially cylindrical surfaces in stepped arrangement.

According to one embodiment of the invention a lined housing for a conical rotary valve comprises a liner of suitable bearing metal having a conical exterior formed of a plurality of substantially cylindrical surfaces in stepped arrangement located in a recess in the housing of complementary shape, the complementary cylindrical surfaces of the liner and housing being an interference fit so that the liner is frictionally secured.

In the accompanying drawing,

Fig. 1 shows a liner for the rotary valve of an internal combustion engine of the kind described in my prior U. S. Patent No. 2,283,594.

Figure 1:
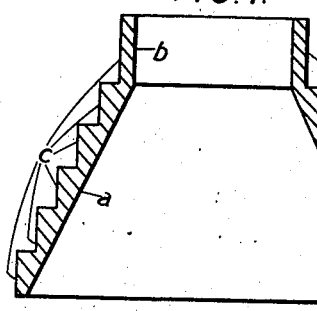
Figure 2:
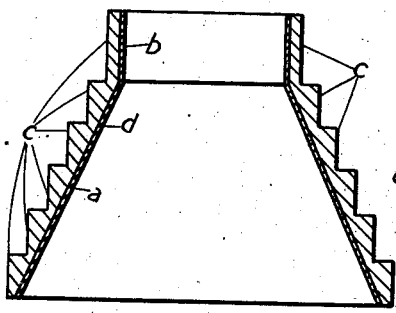
Fig. 2 shows a modification of Fig. 1.

As shown in Figs. 1 and 2, the liner, which may be of phosphor bronze, steel, cast iron or other suitable bearing metal is formed with an internal conical bearing surface $a$ terminating at its narrower end in a cylindrical portion $b$ whilst externally it is of stepped form having a plurality of cylindrical surfaces $c$ which conform substantially to the conical shape of the inner surface $a$ and cylindrical surface $b$. In the example shown in Fig. 2 where the liner has an inner surface $d$ which may be of other metal such as lead, bronze, chrome or other suitable metal which may be deposited electrically or by spraying or may be cast in situ or brazed or otherwise suitably attached therein. The term "interference fit" is used herein to define relative dimensions of parts fitting together so that at normal and equal temperatures they are relatively immovable except by the application of considerable force. The term "complementary metal" is used herein to indicate another metal or one of a group of metals which is known as suitable or complementary to that previously in mind or specified for the purpose of combination therewith for relatively sliding surfaces, as known in the art for example of bearings.

Figure 3:
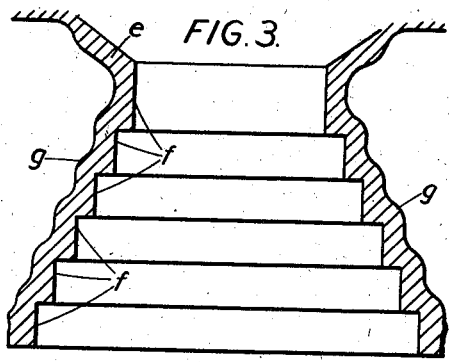
Fig. 3 shows a housing in a cylinder head adapted to receive the liner shown in Fig. 1 or 2.

As shown in Fig. 3 the housing $e$ is formed with internal stepped formation complementary to the external stepped shape of the liner and the cylindrical portions $f$ are made of such dimensions as to be an interference fit at equal temperatures with the liner within the normal range of use. The external contour of the housing is shown of wavy form at $g$ conforming to the ridges of the steps, the purpose of which is to provide thickness of metal without excess weight.

Figure 4:
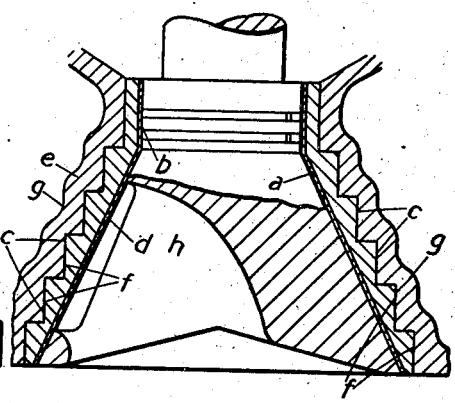
Fig. 4 is an assembly drawing showing the housing of Fig. 3 fitted with the liner of Fig. 2 and a rotary valve therein.

In the assembly drawing of Fig. 4 the liner of Fig. 2 is shown assembled in the housing of Fig. 3 and fitted with a rotary valve $h$ of the kind described in my earlier U. S. Patent No. 2,283,594.

Figure 5:
Fig. 5 is a part sectional elevation of a rotary valve having an external cover.
Figure 6:
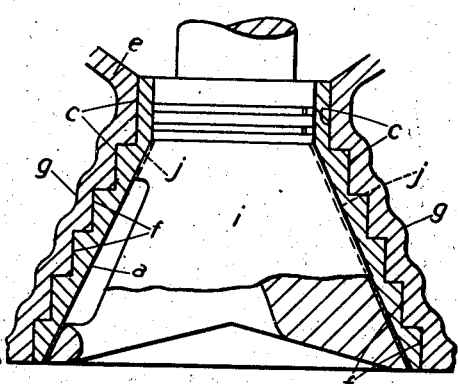
Fig. 6 is an assembly drawing showing the housing of Fig. 3 fitted with the liner of Fig. 1 and the valve of Fig. 5.

As shown in Fig. 5, the rotary valve $i$ is made of metal which is not necessarily suitable as a bearing metal complementary to the metal of the liner shown in Fig. 1. It is therefore made with an external cover $j$ of bearing metal, such as bronze, applied by spray or other suitable method so as to be intimately bonded to the base metal of the valve. The complete assembly of such valve with the housing of Fig. 3 and liner of Fig. 1 is shown in Fig. 6.

The invention provides an effective method of enabling metals to be used for the basic portions, such as the cylinder head and/or valve body whilst enabling suitable complementary bearing metals to be used. Thus in the assembly shown in Fig. 4 the housing $e$ may be of magnesium or aluminum alloy, the liner may be of steel or cast iron and the inner surface $d$ may be of lead bronze, chrome, or other metal suitable as a bearing but unsuitable for the construction of either the housing $e$ or the liner. Again, in the assembly shown in Fig. 6, the housing and liner may be of the same metals as described for Fig. 4, whilst the bearing surface $j$ may be of the same metal as suggested for the inner surface $d$. Furthermore, the liner shown in Fig. 1 or Fig. 6 may be of a suitable metal such as bronze or one of the special cast irons or steels to co-operate with a rotary valve of a suitable metal without an outer cover.

In use, to obtain assembly, it is convenient to heat the housing and freeze the liner until relative dimensions of the complementary substantially cylindrical portions are such that the liner can be freely inserted in the housing. Upon contact or otherwise as their relative difference of temperature is reduced, the liner expands and/or the housing shrinks until interference is established, when the complementary surfaces are pressed together. Any air trapped between is expelled initially from between the surfaces as they close or through the ports and any residue finally disperses through the pores of the metal. The degree of interference is such that, at normal low temperature, the difference is not such as to exceed the elastic limit of the material and cause fracture say of the housing, though compression of grain may occur, whilst at normal high temperature the difference of coefficient of expansion does not allow the housing to expand away from the liner. The normal pressure between the surfaces will be sufficient to prevent the liner from turning though locking pins may be inserted for such purpose, if desired.

In some cases, according to the metals used, the liner can be pressed into the housing without substantial difference of temperature.

What I claim is:

1. A housing and liner for a conical rotary valve characterized in that the contiguous surfaces of the housing and liner are substantially conical in form and have a wide angle of taper too great, if smooth, for a pressed or shrunk fit and requiring end clamping means, said surfaces comprising a plurality of interengaging complementary substantially cylindrical annular surfaces progressively inwardly offset from one another diametrically of the housing and liner in continuous stepped arrangement, and horizontal abutting surfaces progressively inwardly offset from one another diametrically of the housing and liner, the complementary vertical cylindrical surfaces of the housing and liner being adapted to be gripped by shrinking engagement with each other.

2. A housing and liner for a conical rotary valve characterized in that the contiguous surfaces of the housing and liner are substantially conical in form and have a wide angle of taper too great, if smooth, for a pressed or shrunk fit and requiring end clamping means, said surfaces comprising a plurality of short equal length interengaging complementary substantially cylindrical annular surfaces progressively inwardly offset from one another diametrically of the housing and liner in continuous stepped arrangement, and short equal width horizontal abutting surfaces progressively inwardly offset from one another diametrically of the housing and liner, the complementary vertical cylindrical surfaces of the housing and liner being adapted to be gripped by shrinking engagement with each other.

3. A housing and liner for a conical rotary valve characterized in that the contiguous surfaces of the housing and liner are substantially conical in form and have a wide angle of taper too great, if smooth, for a pressed or shrunk fit and requiring end clamping means, said surfaces comprising a plurality of interengaging complementary substantially cylindrical annular surfaces progressively inwardly offset from one another diametrically of the housing and liner in continuous stepped arrangement, and horizontal abutting surfaces progressively inwardly offset from one another diametrically of the housing and liner, each of said complementary cylindrical surfaces being in contact under pressure following engagement by a shrinking operation.

FRANK METCALF ASPIN.